(12) United States Patent
Bouchard

(10) Patent No.: US 6,206,104 B1
(45) Date of Patent: Mar. 27, 2001

(54) BARE ROOT TREE AND STUMP EXTRACTING TOOL

(76) Inventor: John M. Bouchard, P.O. Box 315, Davenport, WA (US) 99122

( * ) Notice: Subject to any disclaimer, the term of this patent is extended or adjusted under 35 U.S.C. 154(b) by 0 days.

(21) Appl. No.: 09/200,556

(22) Filed: Nov. 27, 1998

(51) Int. Cl.$^7$ ................................................ A01D 31/00
(52) U.S. Cl. ............................. 171/46; 171/45; 111/101; 37/302
(58) Field of Search .......................... 37/301, 302, 303, 37/405, 410, 903, 403; 171/45, 46, 53, 63, 105, 106, 107; 414/716, 722, 723, 724, 725, 726; 111/100, 101

(56) References Cited

U.S. PATENT DOCUMENTS

| | | | |
|---|---|---|---|
| 2,091,427 | 4/1937 | Brodersen | 97/50 |
| 2,303,415 | 12/1942 | Williams | 37/2 |
| 2,791,340 | * 5/1957 | Haines et al. | 414/699 |
| 3,017,719 | 1/1962 | Sigler et al. | 47/58 |
| 3,103,076 | * 9/1963 | Schultz | 37/303 |
| 4,120,405 | * 10/1978 | Jonest et al. | 414/24.5 |
| 4,356,644 | * 11/1982 | Harkness | 37/2 R |
| 4,517,755 | 5/1985 | Nicholson | 37/117.5 |
| 4,641,439 | * 2/1987 | Shirek | 37/2 R |
| 4,676,013 | * 6/1987 | Endo | 37/2 R |
| 5,111,599 | * 5/1992 | DeSalvo et al. | 37/2 R |
| 5,333,693 | 8/1994 | Severeid | 171/82 |
| 5,476,356 | * 12/1995 | Weiss | 414/24.5 |
| 5,479,731 | 1/1996 | Widegren | 37/302 |
| 5,664,348 | * 9/1997 | Omann | 37/405 |
| 5,950,549 | * 9/1999 | Stoner | 37/302 |

FOREIGN PATENT DOCUMENTS

3120918 * 12/1982 (DE) .

* cited by examiner

Primary Examiner—Robert E. Pezzuto
Assistant Examiner—Nathan Mammen
(74) Attorney, Agent, or Firm—Keith S. Bergman

(57) ABSTRACT

A tool, for mounting on a tractor or backhoe having a three or four point hitch to pivotally mount the tool on a laterally extending horizontal axis for vertical motion and for pivotal motion about the horizontal axis, provides a frame having connecting structure to releasably interconnect with the hitch and extracting structure to move in and beneath an arborescent root system to lift that system from the earth in which it is resident. The connecting structure provides spaced pivot pins to pivotally interconnect with the lifting arms of the hitch and one or two spacedly distant tilt arm brackets to interconnect with the tilting arm or arms of the hitch. The extracting structure provides a plurality of elongate extracting tines, at least some of which have elongate fins depending therefrom to direct motion in the earth, that are carried in laterally spaced relationship by an elongate, laterally extending lowermost beam of the frame to extend distally from the hitch.

2 Claims, 2 Drawing Sheets

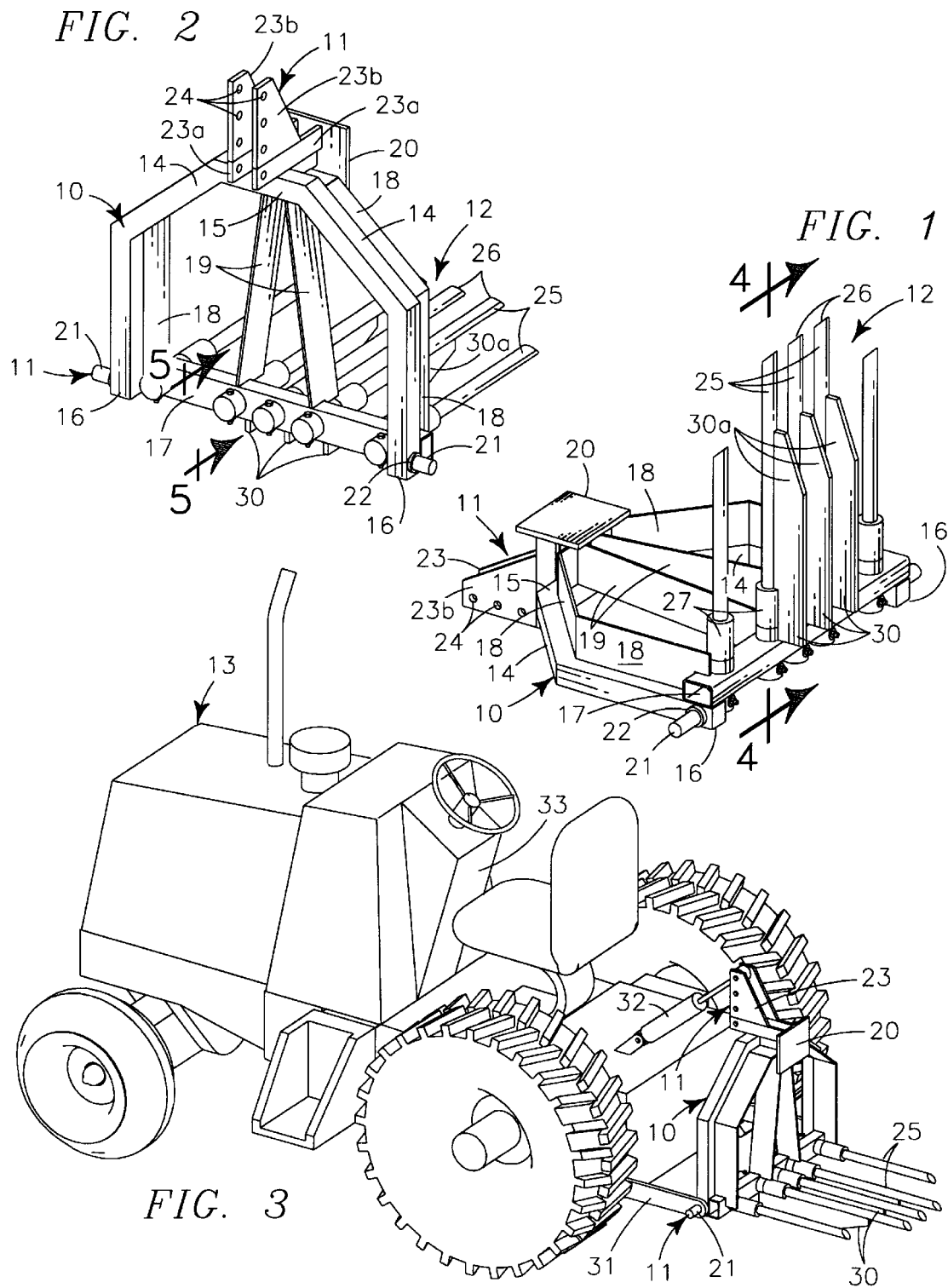

BARE ROOT TREE AND STUMP EXTRACTING TOOL

BACKGROUND OF INVENTION

1. Related Applications

There are no applications related hereto heretofore filed in this or any foreign country.

2. Field of Invention

This invention relates generally to removing arborescent material from land, and more particularly to a tool for bare root extraction of trees and stumps that is operated by the tool hitch of a tractor or front-end loader.

3. Background and Description of Prior Art

As the extraction of larger nursery stock has developed and progressed, especially from manual to mechanical methods, two different processes for extraction and preservation of the viability of the stock from the time of extraction to reestablishment in the earth have devolved, the first being the "balled root" process and the second being the "bare root" process.

The bare root process is the older because of its similarity to the previously existing manual extraction methods, but the first to establish economic viability in the modern nursery industry, and that still most commonly used, is the balled root process. In this later process, the ball of roots in close proximity to the trunk or stem of arborescent material is preserved and the peripheral root system outside that area is removed, usually during the extraction process but sometimes thereafter. The remaining root ball then generally is encased either in some type of a wrapping, such as burlap or other degradable cellulosic material established and maintained thereabout by tying or other fastening or by placement in configurationally sustaining containers such as cans or pots. This method of extracting, moving and merchandising trees and shrubs removes substantial amounts of the peripheral and tap root systems of plants to cause disruption of their overall biological systems with resultant shock-type reactions that often are sufficient to kill the plants over a period of time, if not immediately, and to substantially lessen their statistical viability.

The bare root extraction method loosens the soil about the roots of a tree or shrub and thereafter lifts the root structure from the earth to maintain a substantially greater proportion of the peripheral root structure, and tap root if present, outside the central ball that would be preserved in the balled root extraction process. Bare root extraction generally tends to be less damaging to the biological system of the extracted plant because of its less destructive nature and, with proper maintenance of environmental conditions from the times of extraction to re-establishment of a plant in the earth, the system tends to provide statistically higher survival rates for nursery stock after extraction and also generally makes transportation and storage of the extracted material easier and more simple. Though bare root type of extraction, especially of larger nursery stock, has increased in the recent past, it probably is not and has not been so extensively used as balled root extraction largely because of the difficulties involved in the bare root extraction process and the lack of specific mechanical apparatus to efficiently and effectively accomplish it. The instant invention seeks to provide a tool for use on existing machines such as tractors, backhoes and front end loaders that efficiently and effectively accomplishes bare root extraction of larger trees, shrubs and stumps, whether of a nursery stock or other nature.

Traditional digging tools of mechanical earth moving equipment are not particularly effective in bare root tree extraction as buckets, shovels and the like tend to shear the earth where they enter it and this action also tends to shear root structure in the path of the digging device to destroy the peripheral root structure outwardly of the digging area. Attempts have been made to accomplish bare root extraction by use of machines such as powered shovels or cranes by fastening the movable digging element of the machine to a plant trunk or stem above the earth sustaining it and extracting the plant by pulling it upwardly, but this has not proven particularly effective because, at the time of pulling, the peripheral root structure commonly is widespread and substantially contained in the surrounding earth. By reason of the comparatively low tensile strength of the peripheral root systems of plants and the nature of their earth engagement, most of the peripheral roots are severed from a plant when it is removed in this manor. Usually no more roots remain with pulling type extraction than would remain were the plant extracted by traditional balled root digging methods.

To solve this problem the instant tool provides a frame carrying a plurality of horizontally spaced tines that may be inserted in the earth in angulated orientation from a position adjacent a plant root structure to pass through and under the root structure with little, if any, damage to the roots. The tines then are moved by their supporting hitch structure firstly in a loosening fashion by changing their angulation in a pivotally upward motion and secondly thereafter in an upward lifting motion to extract the root structure from the embedding earth. This extraction process tends to loosen the soil beneath and about the root structure before causing substantial upward motion so that a substantially larger proportion of the peripheral roots remain in tact during the extractive process rather than being severed or broken off as with ordinary mechanical digging or pulling processes. The extraction device after plant extraction also serves a secondary function of supporting the extracted tree or shrub for transport to a distant position for processing, storage or further transport by other means.

To provide economic viability, the instant tool has a supporting frame structure that is attachable to three or four point tool hitches of existing earth moving machines for direct operation by the existing systems of those machines without required intervening mechanical linkage between the machines and the extraction tool. The tool frame may be readily configured for attachment to most existing three or four point hitches of earth moving machines that provide pivotal mounting of a tool on first spacedly opposed lifting arms for vertical motion and on one or two second tilting arms that cause pivotal motion of the tool about the axis of pivot through the lifting arms. The tool may be used on a machine either in a forwardly mounted position as in the case of a tractor or front end loader or in a rearwardly mounted position as is in the case of a backhoe type machine. This structure and its motion are in contradistinction to previously known tree and stump extraction devices that move hook-like or claw-type tools horizontally through the earth or use intervening mechanical linkage between the tool and a powering machine hitch to cause either horizontal or vertical extraction or both only upon horizontal motion of the powering machine over the earth.

To be effectively functional, the instant tool must provide a plurality of relatively long spaced extraction tines of small cross-section that may be easily placed in and beneath a root structure to provide soil loosening and lifting over a substantial area while minimizing damage to any roots that are in or near the path of the extraction tines during motion. To allow use of tines of relatively small cross-sectional area and to aid their insertion in the earth, I provide depending fin-like structures on at least some tines to guide the finned tines along a lineal course determined largely by their orientation at the point of initial earth entry. This fin structure not only relieves substantial stresses and strains upon the interconnection of the tines with a supporting frame structure, but also tends to maintain the spacial configuration of the extraction tines during their insertion, especially in non-homogeneous soils containing area of harder or more dense material. I releasably mount the extraction tines in collars carried by the tool frame to provide additional strength in the interconnected areas and to allow removal of tines for maintenance and replacement or variance of their configurational array if desired or required for specialized purposes. The fin structure is not necessarily required and extraction tines without it are effectively usable in my tool, especially in looser soil types not having any substantial amount of particulated rock. Such finless tines are within the ambit and scope of my invention.

The instant tool may be effectively used for the extraction of the root structure of stumps to provide a multifunctional use for the tool. This provides additional benefits not only in the horticulture industries, such as in removing stumps after tree removal from a Christmas tree farm, but also in land clearing generally where the tool may be formed in required size and strength to remove trees, bushes, stumps and other vegetative debris. The tool may also be used in other earth related tasks such as concrete removal and breaking, especially of flat slabs; extracting and transport of boulders; transport of agricultural products and their containers, and other similar tasks. These potential multifunctional uses add substantially to the economic viability of the tool, especially for use in smaller horticultural enterprises where specialized tools for such purposes may not be available.

My invention lies not in any one of these features individually, but rather in the synergistic combination of all of its structures that necessarily give rise to the functions flowing therefrom.

SUMMARY OF INVENTION

The bare root tree and stump extractor provides a yoke-like frame having horizontally extending, laterally opposed mounting pins for pivotal mounting on the lifting arms and one or more spaced vertically extending brackets for mounting the tilting arm or arms of a multi-point hitch of a powering machine. The frame provides an elongate, laterally extending, lower horizontal beam carrying a plurality of laterally spaced extracting tines extending spacedly outwardly from a mounting hitch. One or more of the extracting tines may carry vertically depending fins to direct tine motion in the earth. The extracting tines may be fixedly or releasably interconnected on the lowermost horizontal beam.

In providing such a device, it is:

A principal object to create a tool for use on multi-point hitches of existing powering machines, such as tractors, backhoes and excavators, for bare root extraction of trees and stumps from the earth in which they are resident.

It is a further object to provide such a tool that has a plurality of linear, spacedly arrayed extraction tines that may be inserted in and beneath the root structure of a tree, shrub or stump in angulated orientation to subsequently be pivoted upwardly to loosen the plant roots from earth in which they are resident before vertically lifting the root structure from the earth, to preserve substantial portions of the peripheral root structure in viable undisturbed interconnection with the extracted plant.

It is a further object to provide such a tool that has extracting tines of substantial length and relatively small cross-sectional area that may have depending fins to guide and determine the course of the tines motion during passage through the soil to minimize stress and strain upon the tool and maintain the relaxed array of the extracting rods during their insertion in the earth.

A still further object is to provide such extracting tines that may be fixedly or releasably interconnected in collar structure carried by the beam supporting them to provide additional rigidity and strength for the connection while, in the releasable mode, allowing replacement or repair of damaged rods and change in configuration of the rod array.

A still further object is to provide such a tool that when removing stumps tends to remove substantial amounts of the soil surrounding the root structure and leave that soil in place at the removal site.

A still further object is to provide such a tool that may have multiple additional potential uses to increase its economic viability.

A still further object is to provide such a tool that is of new and novel design, of rugged and durable nature, of simple and economic manufacture and one otherwise well suited to the uses and purposes for which it is intended.

Other and further objects of my invention will appear from the following specification and accompanying drawings which form a part hereof. In carrying out the objects of the invention, however, it is to be understood that its essential features are susceptible of change in design and structural arrangement, with only one preferred and practical embodiment of the best known mode being illustrated in the accompanying drawings and specified, as is required.

BRIEF DESCRIPTION OF DRAWINGS

In the accompanying drawings which form a part hereof and wherein like numbers of reference refer to similar parts throughout:

FIG. 1 is an isometric view of the extracting tool with its frame in a horizontal position to show especially the forward and lower portion of the device.

FIG. 2 is an isometric view of the tool of FIG. 1 with the frame in a vertical operative position to show especially the rearward structure and frame of the device.

FIG. 3 is an isometric view of the tool of FIG. 1 mounted on the rear three-point tool hitch of a wheeled tractor.

DESCRIPTION OF THE PREFERRED EMBODIMENT

Figure 4:
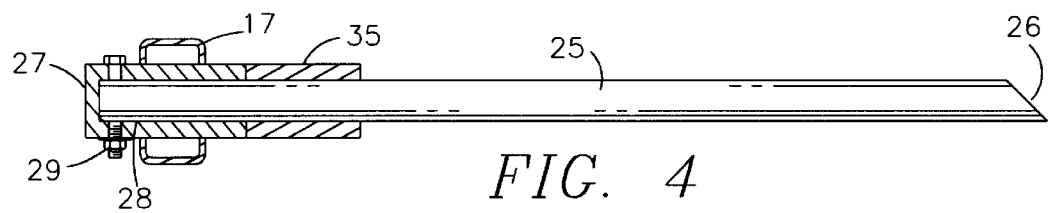
FIG. 4 is an elongate, vertical cross-sectional view through one of the extracting tines of the tool of FIG. 1, taken on the line 4—4 thereon in the direction indicated by the arrows.
Figure 6:
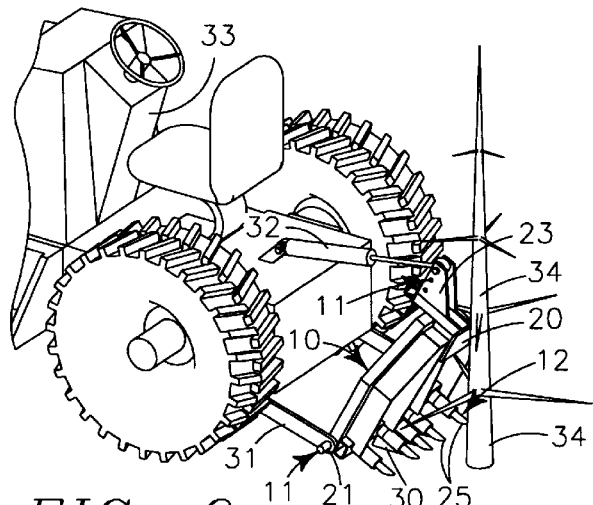
FIGS. 6–8 are three forward looking orthographic views of the tractor mounted device of FIG. 2 in three sequential extracting stages showing the extraction process using the instant tool.

Referring to FIGS. 1 and 2, it is seen that my invention generally provides frame 10 carrying connecting structure 11 for interconnection with the tool hitch of powering device 13 and extracting structure 12 extending perpendicularly from the frame.

Frame 10 provides a planar yoke formed by similar angulated sides 14 interconnected in their upper adjacent portions by flat back 15 and carrying similar vertically depending legs 16 interconnected in their lowermost portions by laterally extending lower beam 17 structurally carried on the forward surfaces of the legs. These frame elements are formed of appropriately configured metallic box beams joined in their adjacent interconnecting portions by welding to provide a unitary frame of appropriate strength, rigidity and durability. The yoke 14, 15 and legs 16 are reinforced on their forward surfaces by forwardly extending, structurally interconnected plates 18. Medial angulated plates 19, having the major cross-sectional dimension extending in an elongate direction, communicate from back 15 of the yoke to the lower beam 17 for additional strength and rigidity. The upper forward portions of the angulated plates 10 structurally carry upper bracket plate 20 on their forward edges to protect the forward portion of a tilting arm connector bracket carried by the yoke and to support a tree or shrub carried on the tool.

The dimensional configuration of the frame 10 is such that the distance between the distal surfaces of vertical legs 16 allows the frame to fit between the spaced lifting arms of the tool hitch of a powering device carrying the tool to allow the tool to be pivotally mounted between those lifting arms. The vertical height of the medial flat back 15 of the yoke is such that, when the frame is carried on the lifting arms of a powering device, a connecting bracket carried by flat portion 15 may be interconnected with a tilting arm of the powering device. These dimensions are somewhat standardized for three point hitches of various manufacturers of powering devices in the present day marketplace and a tool of appropriate configuration may be used with many of those powering devices produced by different manufacture.

Connecting structure 11 provides two axially aligned connecting pins 21 extending laterally in a horizontally outward direction from the portion of each of the laterally outer surfaces of vertical legs 16 of the frame. These connecting pins 21 are joined to the carrying leg 16 by collars 22 to strengthen and make more rigid the structural interconnection of the elements. The connecting pins 21 preferably are positioned in a lower position on the legs 16 so that when the pins are interconnected with the lifting arms of a powering device the frame structure will be substantially vertical when the lifting arms are substantially horizontal, though such positioning is only convenient and not essential. The diameters of connecting pins 21 should be such as to pivotally interconnect with the lifting arms of a powering device carrying the tool, but such pin size is reasonably standardized and one pin size will be accepted by many of the three point hitches produced by various manufacturers of such devices in the present day marketplace.

The connecting structure 11 also provides two similar laterally spaced tilting arm connecting brackets 23 carried by the medial portion of flat yoke back 15 to receive therebetween the connecting structure of a tilting arm of a multi-point hitch. Each bracket 23 provides elongate base plate 23a, structurally interconnected with the upper surface of yoke back 15 and the rearward surface of tilting bracket plate 20, which in turn structurally carries upstanding trapazoidal bracket plate 23b. Each of the bracket plates 23 define a plurality of paired aligned and vertically spaced fastening holes 24 to receive a connecting pin therebetween to pivotally interconnect the tilting arm of the hitch of a powering device with the tilting arm connecting bracket 23. The connecting pins accepted by many tilting arm connectors of hitches of various present day manufacturers are standardized.

Extracting structure 12 provides a plurality of elongate spacedly arrayed extracting tines 25, in the instance illustrated of circularly cylindrical configuration with wedge shaped outer end portions 26 to aid insertion into the earth. The tines 25 illustrated are of solid rod-like nature, but if such structure is not required for rigidity or strength they may be formed of peripherally defined tubing having solid sharp ends (not shown). The circularly cylindrical shape of the tines also is not a necessary configuration and is used because of convenience and ease of manufacture, but other cross-sectional shapes are within the ambit and scope of my invention. The tines illustrated extend substantially perpendicularly from the frame, but this angular relationship is not necessary and the included angle between the elements may vary generally from about seventy to one hundred forty degrees. Depending on a particular hitch structure on which the tool is to be mounted, however, and especially at lower ranges of angulation, it may be necessary to use an auxiliary link to interconnect the tilting arm with the tilling arm of a hitch.

Figure 5:
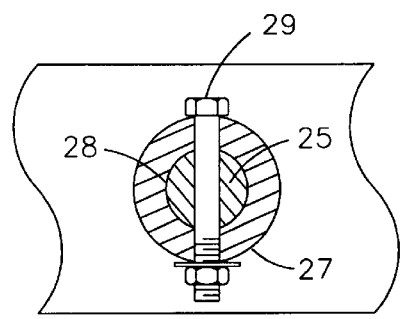
FIG. 5 is a traverse, horizontal cross-sectional view through the connecting structure of one of the extracting rods of FIG. 1, taken on the line 5—5 thereon in the direction indicated by the arrows.
Figure 7:
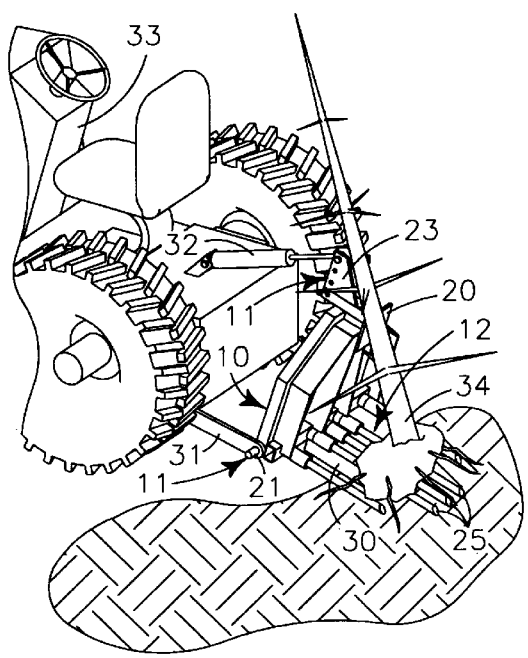
Figure 8:
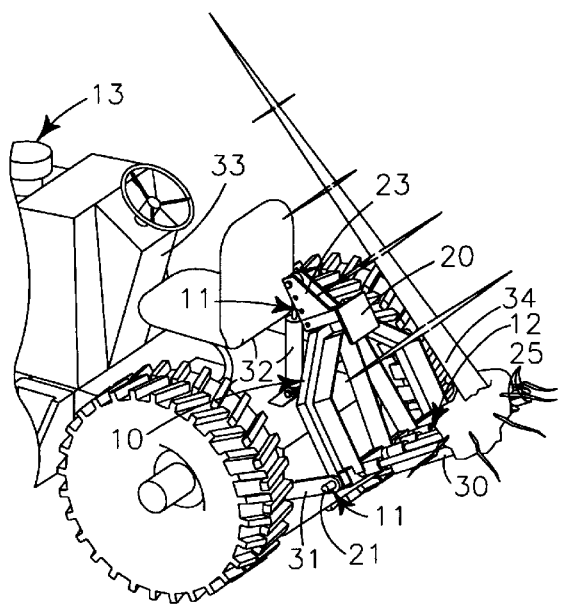

Each tine 25 is interconnected with lower beam 17 of frame 10 by a circularly cylindrical tubular collar 27 that extends through and is structurally carried by the lower beam. As seen in FIGS. 4 and 5, each collar 27 defines an internal channel 28 that accepts the inner end portion of a tine 25 in an immediately adjacent fit to aid structural interconnection. Each tine 25 also carries collar 35 spacedly forward of its inner end to limit the extension of the inner end portion of the tine inwardly beyond the inner end of collar 27 and strengthen the connection of the tine within the collar. This interconnection of tines 25 and collars 27 as illustrated is of a releasable type, wherein the inner end portion of the tine is fastened in the channel 28 of the associated tubular collar 27 by elongate fastener 29, in the instance illustrated comprising a bolt and threadedly engaged nut extending between the interconnected elements. The releasable type of interconnection is preferred so that tines 25 may be moved to change their spacial array in the lower beam 17 or damaged tines may be removed for repair or replacement, but such releasable joinder is not required and the tines may be permanently fastened in the collars 27 by welding, if desired or necessary.

At least some tines 25 preferably carry structurally interconnected rudder-like fins 30 depending vertically from the lower surface if the tine. In the instance illustrated the fins 30 extend from the forward edge of tubular collar 35 to a point spacedly inwardly from the forward end portion of the tine. The lower forward portion 30a of each fin preferably is angulated in a forward and inwardly extending fashion to aid insertion of the tine into the earth. The fins 30 provide more effective operation of my tool and greater strength and rigidity for the tines carrying them, but are not essential to operation of the tool and tines may be used without the depending fins 30.

The particular array of the tines 25 is not essential to the operation of my tool and that array may be varied to provide the rigidity, strength and operability required for a particular application. For the extraction of larger nursery stock, preferably the tines are formed of tubular elements of approximately one and one quarter inch (1.25") diameter and the fins are formed of one-half by three inch steel (0.50"×3.00") plate. The length of the tines for nursery stock extraction preferably is approximately thirty inches. Not all tines in a particular array need be of the same length, and I have found that it often is desirable, to provide maximum efficiency for use of the tool, to use five tines, with similar laterally outermost tines that are shorter than three medial tines that are spaced in closer adjacency, as illustrated especially in FIGS. 1 and 2.

Having thusly described my tool, its operation may be understood.

Firstly, a tool is formed according to the foregoing specification and attached to the multi-point hitch of powering device 13, which in the instance illustrated is wheeled tractor 33. This wheeled tractor 33 provides a traditional rearwardly positioned three point hitch having paired opposed lower lifting arms 31 and media tilting arm 32. For use, the tool is appropriately positioned and the lift arms 31 are interconnected to the opposed connecting pins 21. The tilt arm 32 is interconnected between one of the cooperating pairs of holes 24 defined in connecting bracket 23.

After tool mounting, the tractor 33 supporting the tool is moved into adjacency with tree 34 or other object to be extracted and the tool is tilted by operation of the tractor tilt arm 32 until tines 25 touch the earth approximately eighteen to twenty-four inches from the trunk, for a tree of ordinary nursery stock size. The tool is then tilted so that the included angle between the tines and a horizontal plane through the earth surface at the place that the tines contact is approximately forty-five degrees. The tractor is then moved rearwardly toward the tree or object to be extracted while the tool is simultaneously lowered into the earth so that the tines move into the earth, partially under and otherwise within the rout structure of tree 34. This motion is continued preferably until lower beam 17 is immediately upwardly adjacent the earth surface and the tines are fully inserted in the earth.

To remove the tree from the earth in which it resides, tilt 32 arm of the tractor is operated to pivot the outer end portions of the tines 25 upwardly to loosen the earth about the rout structure of the tree 34 and begin slight lifting of the root structure from the earth. After the initial pivotal lifting of the root structure and the tree, the pivotal action of the tool is continued by use of the tilt arm while the lifting arms 31 are simultaneously operated to lift the tree upwardly. This process is continued until the tines of the tool are at least horizontal, the tree structure has been extracted from the earth and substantially all connection of the tree with the earth is disestablished. The pivotal motion of the tool may be continued until the trunk of tree 34 tips toward the tractor 33 when it may be supported by the upper part of the frame 10 and particularly the tilting bracket plate 20. In this condition or with additional support or fastening, the tree may be moved by the supporting tractor to a position for disposition.

To unload the tree at a disposition site, the tool is raised, the outer end portions of the tines 25 rotated downwardly by operation of the tractor tilt arm 32 and the tool moved from beneath the supported tree by moving the tractor to responsively move the tines from beneath the root structure.

It is to be noted that the tool may be as readily used for the removal of stumps as for the removal of trees. In this regard, the tool is particularly useful in the removal and clearing of stumps in Christmas tree farm areas after the cutting of Christmas trees and otherwise in land clearing in general, aside from its use with viable nursery stock.

It is also to be noted that the size and strength of the tool are not limited by its function or use and both parameters may be increased as required to extract as large nursery stock, stumps and other material as desired.

It is further to be noted that the connecting structure is not essentially limited to that illustrated and described for a rear mounted three point hitch of a wheeled tractor and may be readily modified by an ordinarily killed mechanic to be interconnected with either forwardly or rearwardly mounted hitches, three point hitches having a tilting arm in other positions than that illustrated herein and four point hitches having two spacedly adjacent tilting arms rather than one. All such variations are within the ambit and scope of my invention.

The foregoing description of my tool is necessarily of a detailed nature so that a specific embodiment of it might be set forth as required, but it is to be under stood that various modifications of detail, rearrangement and multiplication of parts might be resorted to without departing from its spirit, essence or scope.

Having described my invention, what I desire to protect by letters patent and

What I claim is:

1. A tool, for use on a powering vehicle having a multi-point hitch with paired laterally spaced lifting arms and at least one tilting arm, for bare root extraction of arborescent material from the earth, comprising in combination:

a frame having an upper yoke structurally carrying similar spaced vertically depending leas having lower end portions interconnected by a lower beam;

connecting structure carried by the frame having means for pivotal interconnection with the paired laterally spaced lifting arms and the at least one tilting arm of the powering vehicle; and extracting structure having a plurality of elongate extracting tines carried in linear laterally spaced array in the lower beam to extend therefrom in angulated orientation to the frame and in a direction distal from the connecting structure, wherein at least one of the extracting tines is releaseably carried in a first collar structurally carried in the lower beam by a fastener releaseably extending between the collar and the extracting tine, the extracting tines are elongate cylindrical rods having sharp outer end portion distal from the lower beam to aid earth penetration, and inner ends portions of the rods carry a structurally attached second collar spacedly adjacent the lower bar and abutting the first collar carrying the tine.

2. A tool, for use on a powering vehicle having a multi-point hitch with paired laterally spaced lifting arms and at least one tilting arm, for bare root extraction of trees, large plants and stumps, comprising in combination:

a frame fitting between the lifting arms of the powering vehicle and having an upper yoke carrying similar laterally spaced vertically depending legs with lower end portions interconnected by an elongate laterally extending lower beam;

connecting structure, carried by the frame for releasable interconnection with the multi-point hitch of the powering vehicle having similar opposed pivot pins extending laterally outwardly from each leg of the frame to pivotally interconnect the lifting arms of the powering vehicle, and at least one tilting arm connecting bracket carried by the frame laterally between and spacedly above the pivot pins; a extracting structure having a plurality of elongate extracting tines releasably carried in laterally spaced array in the lower beam to extend therefrom in angulated orientation to the frame and in a direction distal from the connecting structure, said extracting tines releasably carried in first collars, structurally carried in the lower beam, by fasteners extending between the collars and the extracting tines, having second diametrically larger collars structurally carried by the tines adjacent and abutting the first collars to provide strength, rigidity and positioning, having sharp outer ends distal from the lower beam to aid earth penetration, and at least one extracting tine carrying an elongate structurally interconnected fin extending parallel to the tine to aid determination of the tine course during insertion in the earth, said fin extending over the second collar and any adjacent portion of the first collar extending from the lower beam.

* * * * *